(12) United States Patent
Singh et al.

(10) Patent No.: US 12,129,872 B2
(45) Date of Patent: Oct. 29, 2024

(54) APPARATUSES AND METHODS FOR DE-AERATION OF A LIQUID

(71) Applicant: DEERE & COMPANY, Moline, IL (US)

(72) Inventors: Rahul Singh, Pune (IN); Sumit Sunil Kamat, Pune (IN); Daniel C. Jordan, Ames, IA (US); Sourabh Mukhopadhyay, Asansol (IN)

(73) Assignee: Deere & Company, Moline, IL (US)

( * ) Notice: Subject to any disclaimer, the term of this patent is extended or adjusted under 35 U.S.C. 154(b) by 484 days.

(21) Appl. No.: 17/145,528

(22) Filed: Jan. 11, 2021

(65) Prior Publication Data

US 2022/0220983 A1 Jul. 14, 2022

(51) Int. Cl.
| F15B 1/26 | (2006.01) |
| B01D 19/00 | (2006.01) |
| B01D 19/02 | (2006.01) |
| F15B 21/04 | (2019.01) |
| F15B 21/044 | (2019.01) |

(52) U.S. Cl.
CPC ............ *F15B 1/26* (2013.01); *B01D 19/0042* (2013.01); *B01D 19/02* (2013.01); *F15B 21/044* (2013.01)

(58) Field of Classification Search
CPC .......... F15B 1/26; F15B 21/044; B01D 19/02; B01D 19/0042
See application file for complete search history.

(56) References Cited

U.S. PATENT DOCUMENTS

| 4,809,745 A | * | 3/1989 | Hormann | .................. F15B 1/26 |
| | | | | 96/219 |
| 5,051,116 A | * | 9/1991 | Mattsson | .................. F15B 1/26 |
| | | | | 95/260 |
| 5,507,858 A | * | 4/1996 | Jepson | ............... B01D 19/0042 |
| | | | | 96/206 |
| 6,402,810 B1 | * | 6/2002 | Mayer | ................... F15B 21/044 |
| | | | | 96/10 |
| 8,287,000 B2 | | 10/2012 | Schoenherr | |
| 8,960,227 B2 | | 2/2015 | Smith et al. | |

FOREIGN PATENT DOCUMENTS

EP  3073157 A1  9/2016

OTHER PUBLICATIONS

Extended European Search Report and Written Opinion issued in European Patent Application No. 21213936.4, dated May 27, 2022, in 08 pages.

* cited by examiner

*Primary Examiner* — Youngsul Jeong

(57) ABSTRACT

Methods and apparatuses are provided for deaeration of a liquid. Liquid may be impinged onto an inclined baffle and forced through a first plurality of apertures that direct the liquid in one or more directions away from one or more outlets of a reservoir. The liquid may be passed through a second plurality of apertures. Flowing the liquid as described promotes a circuitous route of travel and provides a residence time inside of the reservoir that promotes release of entrained air.

20 Claims, 7 Drawing Sheets

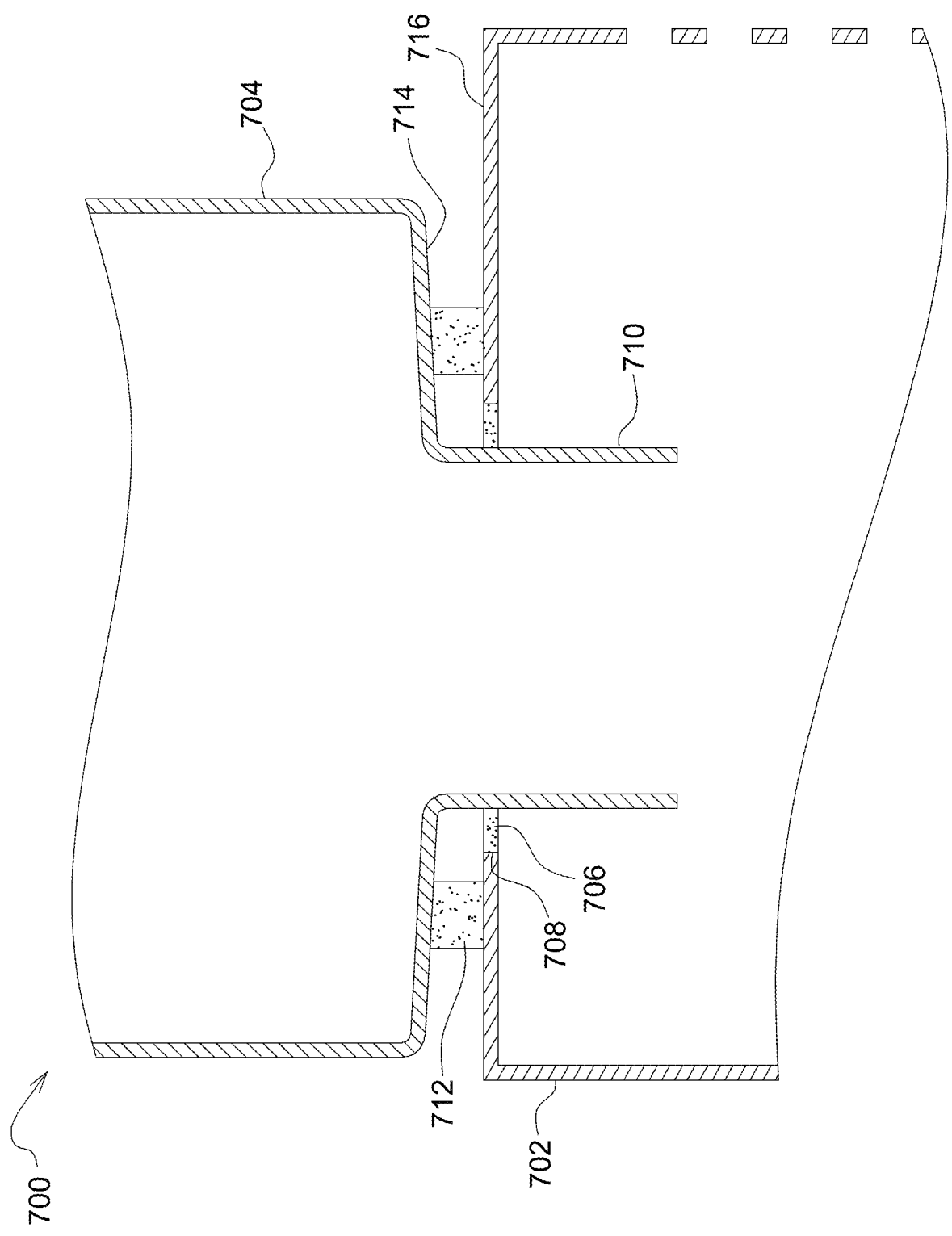

APPARATUSES AND METHODS FOR DE-AERATION OF A LIQUID

FIELD OF THE DISCLOSURE

The present disclosure relates generally to reservoir deaeration.

BACKGROUND OF THE DISCLOSURE

Gases, such as air, are removed from liquid flows, such as coolants, lubricants, or hydraulic fluids, in order to improve performance of the liquids and associated machinery. For example, removing gases from a flow of coolant enhances the cooling performance of the coolant. Because gases are compressible, removal of the gases also improves the ability to pump the liquid. Further, entrained gases can lead to erosion of equipment components.

SUMMARY OF THE DISCLOSURE

A first aspect of the present disclosure is directed to a reservoir for a hydraulic system. The hydraulic system may include a housing that includes a floor and defining a cavity; a baffle disposed in the cavity and dividing the cavity into a first portion and a second portion; and an inlet conduit extending into the first portion of the cavity. The baffle and the floor may define an acute angle. The inlet may include a longitudinal axis. The reservoir may also include a diffusion chamber. The diffusion chamber may include a wall and a first plurality of apertures formed in a portion of the wall of the diffusion chamber. The portion of the wall may extend along less than an entire perimeter of the wall. The reservoir may also include an outlet in fluid communication with the second portion of the cavity. The baffle may include a first portion extending in a first direction from the diffusion chamber; a second portion extending in a second direction from the diffusion chamber; and a second plurality of apertures formed in the second portion of the baffle. The first plurality of apertures may open towards the first portion of the baffle. The second set of apertures may provide fluid communication between the first portion of the cavity and the second portion of the cavity.

A second aspect of the present disclosure is directed to a method of de-aerating a liquid. The method may include flowing a liquid into a cavity of a reservoir, the reservoir comprising a baffle disposed in the cavity, the baffle comprising a first portion that is oriented at an angle relative to a floor of the reservoir; impinging the fluid flow onto a portion of a first side of the baffle that extends along the first portion of the baffle; conducting the fluid flow through a first plurality of apertures into a first portion of the cavity of the reservoir towards a first side of the reservoir; and generating turbulence in the fluid as the fluid exits the plurality of apertures to release a gas entrained in the fluid.

The various aspects may of the present disclosure include one or more of the following features. The diffusion chamber may extend to the baffle, and the baffle may partially enclose the diffusion chamber. The second plurality of apertures may include a plurality of slots. The plurality of slots may be arranged in a plurality of rows. The slots in adjacent rows of the plurality of rows may be offset from each other. The portion of the wall of the diffusion chamber in which the first plurality of apertures is formed may be defined by a spread angle having a vertex lying on the longitudinal axis. The spread angle may be within a range of 30° and 180°. The acute angle defined between the baffle and the floor is within a range of 30° and 45°. The second portion of the baffle may be offset from the floor by a greater extent than the first portion of the baffle is offset from the floor. A seal may be formed between the diffusion chamber and the inlet conduit. The diffusion chamber may define an interior cavity, and the wall of the diffusion chamber may extend beyond the interior cavity.

The various aspects of the present disclosure may also include one or more of the following features. The reservoir may also include a diffusion chamber disposed in the cavity, and the first portion of the baffle may form a portion of the enclosure of the diffusion chamber. The first plurality of apertures may be formed in a portion of a wall of the diffusion chamber. The portion of the wall in which the first plurality of apertures is formed may be defined by a spread angle having a vertex along a longitudinal axis of the diffusion chamber. Flowing a liquid into a reservoir may include flowing the fluid into the diffusion chamber. Fluid may be flowed in a second direction different than the first direction, and fluid may be passed through a second plurality of apertures formed in a second portion of the baffle and into a second portion of the cavity disposed on a second side of the baffle opposite the first side. The second portion of the baffle may be angled relative to the floor, and the second portion may be offset from the floor by a greater extent than the first angled portion of the baffle. Passing fluid through the second plurality of apertures may include directing the fluid towards an outlet of the reservoir disposed on the second side of the baffle opposite the first side of the baffle. The second plurality of apertures may include a plurality of slots.

Other features and aspects will become apparent by consideration of the detailed description and accompanying drawings.

BRIEF DESCRIPTION OF THE DRAWINGS

The detailed description of the drawings refers to the accompanying figures in which:

FIG. 7 is a detail view of another example reservoir showing seals located or otherwise formed between an inlet conduit and a diffusion chamber, according to some implementations of the present disclosure.

DETAILED DESCRIPTION

Figure 1:
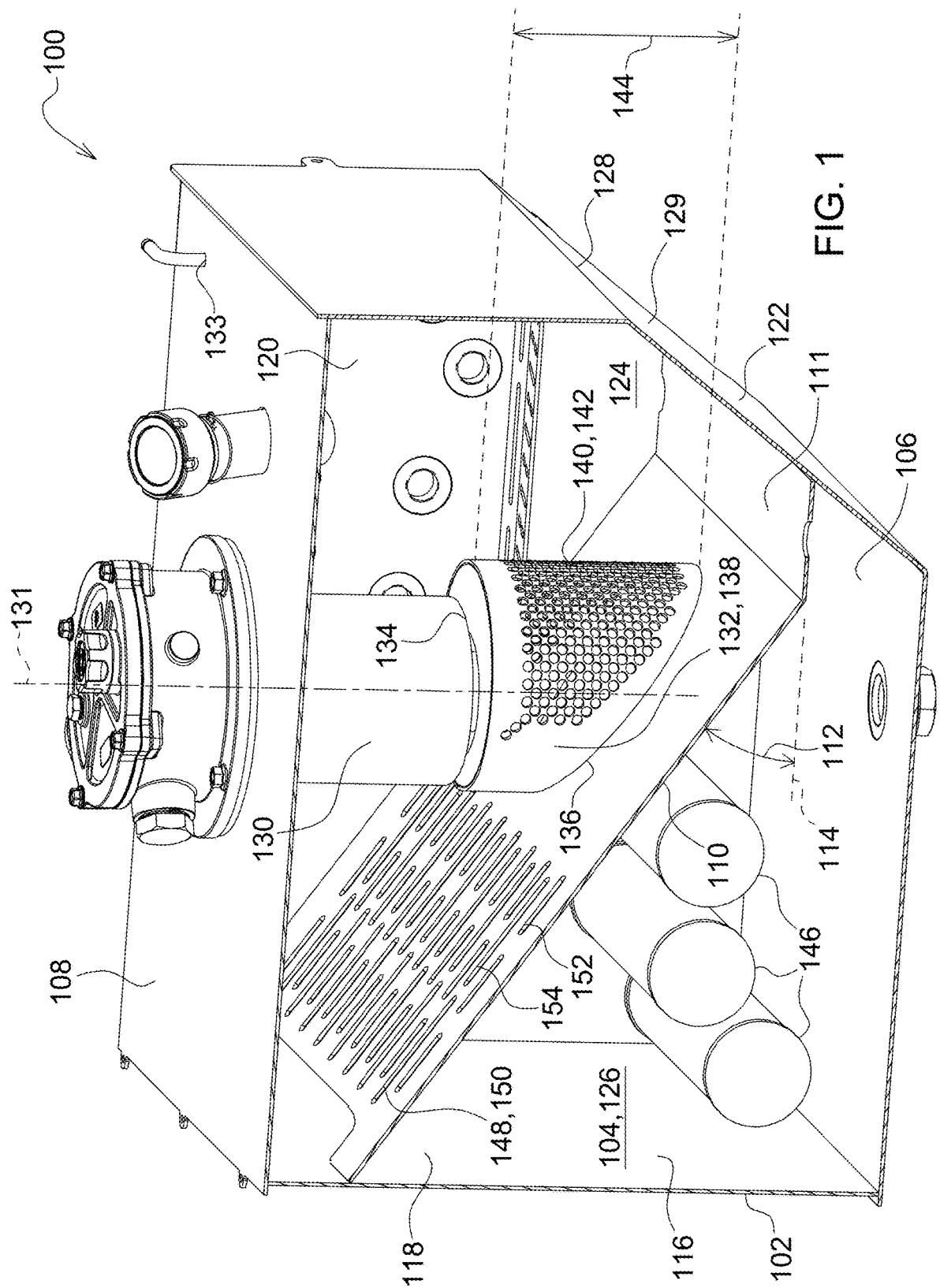
FIG. 1 is a perspective view of an example hydraulic reservoir, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to methods and apparatuses that operate to remove gases or mixtures of gases, such as air, from a flowing liquid, such as hydraulic liquid. The present disclosure provides decreased gas entrainment in a liquid prior to recirculation of the liquid. Although implementations in the context of reducing gas entrainment in hydraulic fluids are provided, the scope present disclosure encompasses other types of liquids. For example, the scope of the present disclosure encompasses reducing gas entrainment in coolants, lubricants, water, and other types of liquids and working fluids. By removing gases from liquid such as these, compression of the fluid is reduced and, consequently, performance of the working fluid is improved. Consequently, the volumetric efficiency of hydraulic equipment is improved.

In addition to providing improved performance of the working fluid by reducing an amount of entrained gases, the methods and apparatuses within the scope of this technology also reduce the risk of cavitation to pumps and other components of a hydraulic system, thereby increasing the service life of those components.

FIG. 1 is a perspective view of an example hydraulic reservoir 100 within the scope of the present disclosure. The hydraulic reservoir 100 includes a housing 102 that defines a cavity 104. The housing 100 includes a floor 106 and a cover 108. An inclined baffle 110 is provided in the cavity 104 and is oriented at an acute angle 112 relative to the floor 106. Although a single inclined baffle 110 is illustrated in the example of FIG. 1, in other implementations, more than one inclined baffle is provided. The angle 112 is illustrated using a line 114 (which represents a plane) that is parallel with floor 106. In some implementations, the angle 112 is within a range of 30° to 45° relative to the floor 106. The inclined baffle 110 engages walls 116, 118, 120, and 122 of the housing 102 and divides the cavity 104 in to a first portion 124 and a second portion 126. Further, the inclined baffle 110 is inclined in a direction extending from the side 122 to side 118, which defines a length and longitudinal direction of the inclined baffle 110. A dimension of the inclined baffle 110 between sides 116 and 120 defines a width of the inclined baffle 110. Although the illustrated housing 102 includes six sides, i.e., the four sides 116, 118, 120, and 122 and a cover 108 and a floor 106, in other implementations, the housing 102 may include addition or fewer sides. Thus, the shape and configuration of the housing 102 and, thus, the reservoir 100, is not limited to the example shown in FIG. 1.

In the illustrated example, the inclined baffle 110 extends along the angle 112 from the side 118 to the side 122. Although the example inclined baffle 110 includes a horizontal portion 111, in other implementations, the horizontal portion 111 is omitted. In the illustrated example, the side 122 includes a bend 128 and an inclined portion 129. The inclined portion 129 operates to direct a flow of liquid exiting from inlet conduit 130, as described in more detail below. In other implementations, the side 122 may include no bends or additional bends. In some implementations, an entirety of the side 122 may be inclined. In other implementations, the side 122 may be free of an inclined portion. In some implementations, one or more sides of the housing 100 may include one or more bends. Moreover, in other implementations, the number, arrangement, and shape of the sides (including whether any of the sides includes one or more bends) of the housing 102 may vary. The inclined baffle 110 is arranged to engage each of the sides such that the cavity is divided into the first and second portions 124 and 126.

The reservoir 100 also includes an inlet conduit 130 and a vent 133. In the illustrated example, the inlet conduit 130 extends from the cover 108 and into the first portion 124 of the cavity 104. In other implementations, the inlet conduit 130 may extend from one of the sides 116, 118, 120, or 122, or the inlet conduit 130 may intercept two or more sides of the housing 102 and extend into the first portion 124 of the cavity 104. In the illustrated example, the inlet conduit 130 has a circular cylindrical shape. In other implementations, the inlet conduit 130 may be cylindrical having a cross-sectional shape that is other than circular. For example, the cross-sectional shape may be polygonal or have a constant cross-sectional shape that includes one or more curved surfaces, such as an oval shape. In some implementations, the inlet conduit 130 may have a tapered shape or a size that otherwise changes a long a length of the inlet conduit 130. The inlet conduit 130 defines a longitudinal axis 131. In some implementations, the longitudinal axis 131 defines a centerline of the inlet conduit 130. The vent 133 permits gases removed from the liquid to escape from the cavity 104.

A diffusion chamber 132 is disposed at an end 134 of the inlet conduit 130. In some implementations, the diffusion chamber 132 may be integral to the inlet conduit 130. In the illustrated example, the diffusion chamber 132 has an enlarged cross-sectional size compared to the cross-sectional size of the inlet conduit 130. The diffusion chamber 132 extends from an end 136 of the inlet conduit 130 to the inclined baffle 110. The inclined baffle 110 encloses an end 136 of the diffusion chamber 132. Thus, the inclined baffle 110 defines a portion of the enclosure of the diffusion chamber 132.

The diffusion chamber 132 includes a wall 138. In some implementations, the wall 138 is bonded to the inclined baffle 110. For example, the wall 138 may be welded to the inclined baffle 110. A portion 140 of the wall 138 includes a first plurality of apertures 142 through which a returning liquid is expelled into the cavity 104. The first plurality of apertures 142 are formed in the portion 140 of the wall 138 in order to control a direction that liquid is expelled from the diffusion chamber 132 and into the cavity 104. Particularly, the first plurality of apertures 142 provides for a defined angle of spread of the liquid passing out of the diffusion chamber 132. Arranging the first plurality of apertures 142 in this manner prevents the liquid from flowing into the first portion 124 of the cavity 104 towards a second plurality of apertures 148 formed in the inclined baffle 110 (discussed in more detail below). The portion of the wall 138 that is remains unperforated acts as a barrier to prevent flow of the returning liquid directly towards the second plurality of apertures 148.

In some implementations, the apertures 142 have a circular shape. In other implementations, the apertures 142 have a shape other than circular. In still other implementations, the apertures 142 have varying shapes. In other instances, the apertures 142 have varying shapes and sizes. In some implementations, the apertures 142 have a common shape but have varying sizes. In some instances, the first plurality of apertures 142 are arranged in a repeating or uniform pattern. In other implementations, the first plurality of apertures 142 are arranged in an irregular or nonuniform pattern. In some implementations, a dimension (e.g., diameter) representing a cross-sectional size of the apertures 142 may be within a range of between 6 mm (0.23 inches (in.)) to 9 mm (0.35 in.).

Figure 2:
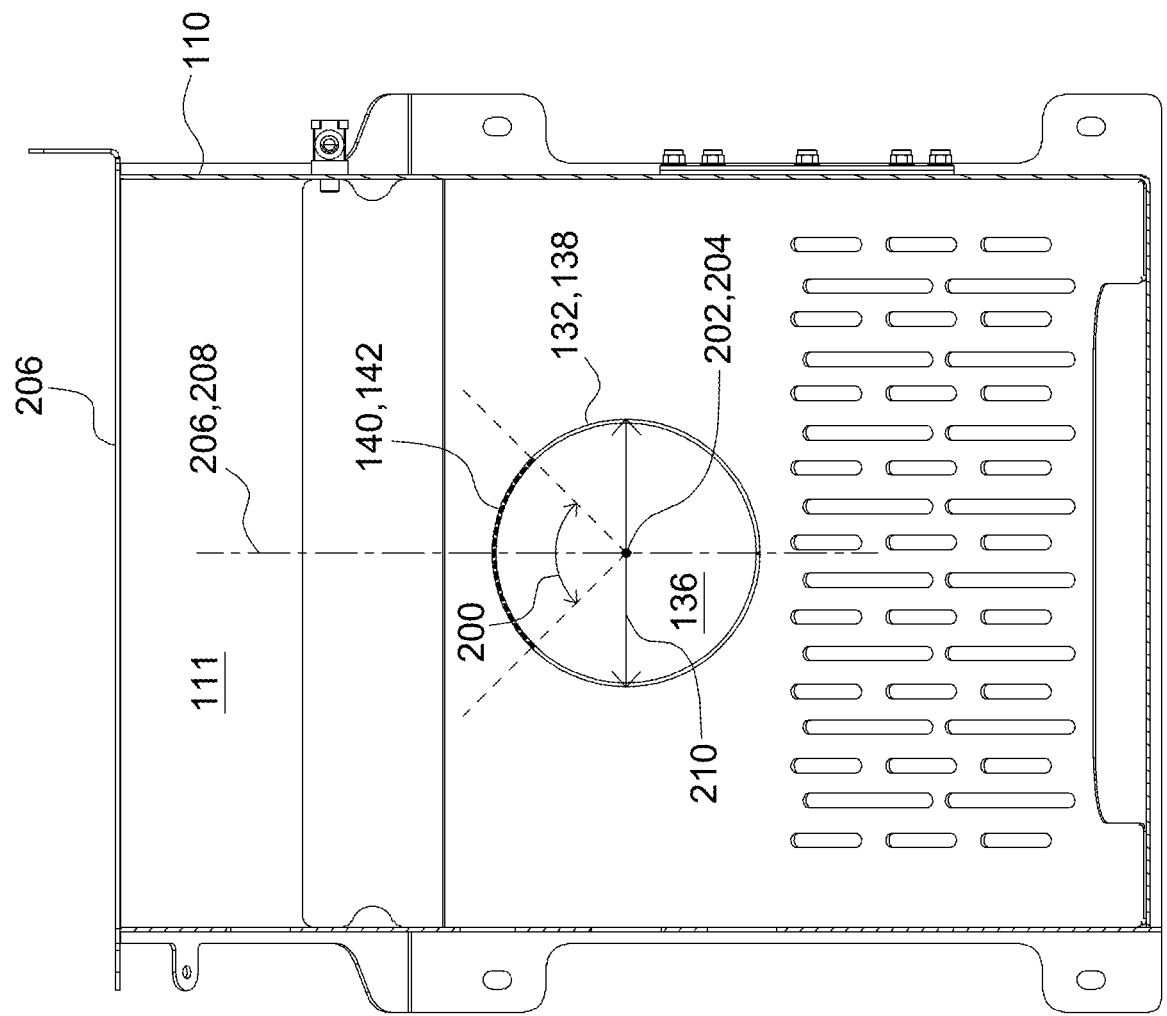
FIG. 2 is a plan view of a portion of the hydraulic reservoir of FIG. 1.

FIG. 2 is a plan view of a portion of reservoir 100 showing the inclined baffle 110 and the diffusion chamber 132. As shown in FIG. 2, the portion 140 of the wall 138 of the diffusion chamber 132 is defined by an angle, referred to as a spread angle 200, having a vertex 202 located on a longitudinal axis 204 of the diffusion chamber 132. The spread angle 200 defines an amount of annularly spread experienced by the liquid as the liquid exits the diffusion chamber 132 in a general direction towards side 122. The portion 140 may extend along an entirety of the length of the diffusion chamber 132 (as measured along the longitudinal axis 204, for example) or along a portion of the length of the diffusion chamber 132 that is less than an entire length of the diffusion chamber 132.

In some implementations, the spread angle 200 is centered on a line 206 that is perpendicular to side 122, as shown in FIG. 2, such that the line 206 divides or bisected the spread angle 200. In the illustrated example, the line 206 is perpendicular to an end 206 of the inclined baffle 110 that is closest to the floor 106 of the housing 102. In some implementations, the spread angle 200 is centered on a plane that extends perpendicularly to the inclined baffle 110. In the illustrated example, the line 206 represents a plane 208 that extends perpendicularly from the inclined baffle 110. As explained above, the spread angle 200 is centered on this plane 208 in some implementations. In some examples, the spread angle 200 falls within a range of 90° to 105°. In still other instances, the angle is within a range of 30° to 180°.

In other implementations, the spread angle 200 may be angularly offset about the longitudinal axis 204 from line 206 and the corresponding plane 208 such that the line 206 and plane 208 do not bisect or the angle 200.

Referring again to FIG. 1, a length of the diffusion chamber 132 extending from the end 134 of the inlet conduit 130 to a location on the inclined baffle 110 contacted by the wall 138 closest to the floor 106 and defines a height 144 of the diffusion chamber 132. In some implementations, the height 144 is within a range of three to four times the outlet size (e.g., diameter) of the inlet conduit 130, located at the end 134. In some implementations, a cross-sectional size 210 (e.g., a diameter) of the diffusion chamber 132 (shown in FIG. 2) is within the range of one and a half times to two times the outlet size (e.g., diameter) of the inlet conduit 130.

As shown in FIG. 1, the reservoir 100 also includes outlets 146 in fluid communication with the second portion 126 of the cavity 104. In the illustrated example, the reservoir 100 includes three outlets 146. In other implementations, the reservoir 100 may include additional or fewer outlets 146. The outlet 146 is located on a side of the baffle opposite the first plurality of apertures 142.

As explained earlier, the inclined baffle 110 includes the second plurality of apertures 148. The second plurality of apertures 148 provides fluid communication between the first portion 124 and the second portion 126 of the cavity 104. Fluid from the first portion 124 of the cavity 104 is forced to pass through the second plurality of apertures 148 prior to entering the second portion 126 of the cavity 104.

Figure 3:
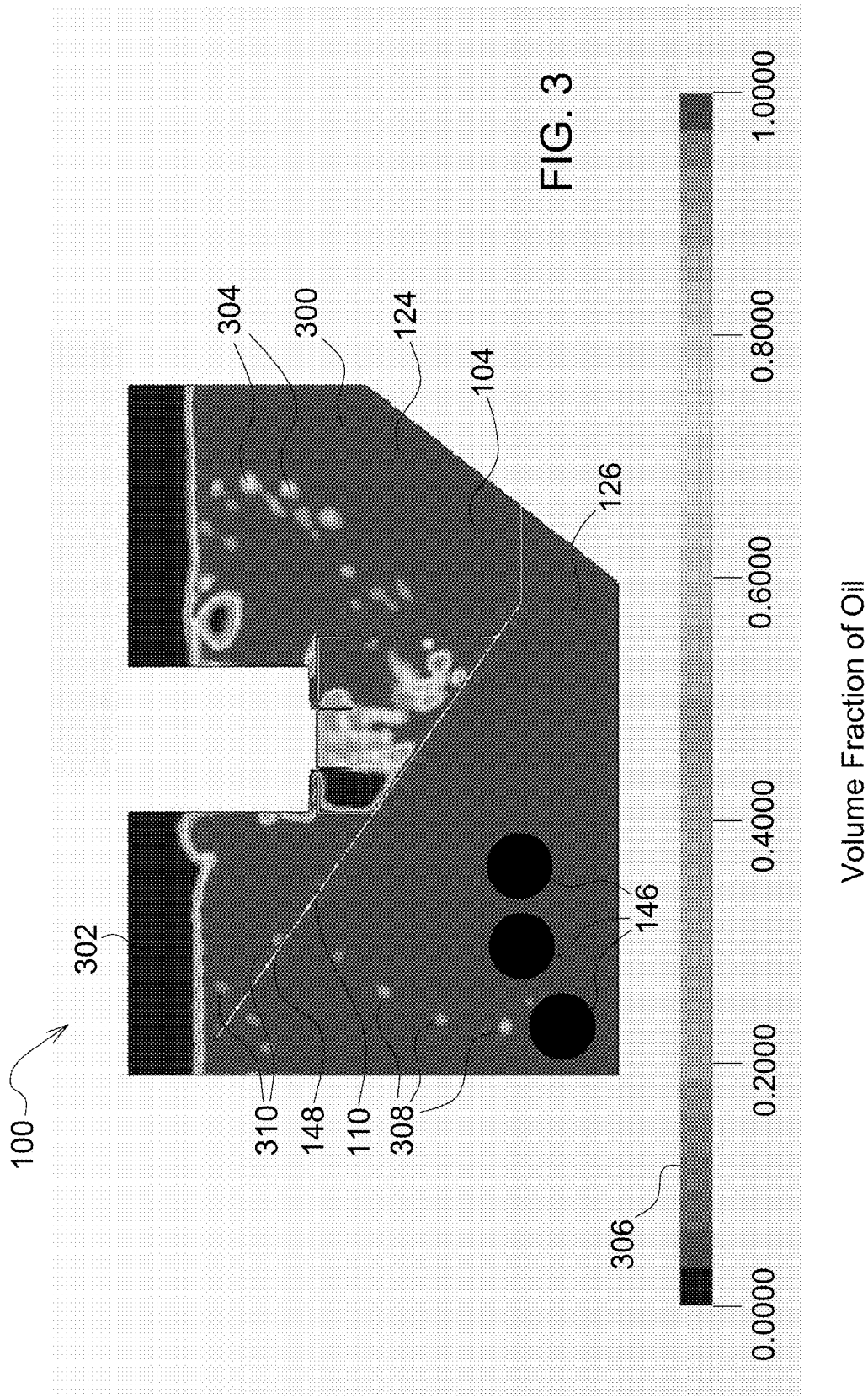
FIG. 3 is a cross-sectional view of the example hydraulic reservoir of FIG. 1 showing a volume fraction plot representing an amount of gas entrained in the liquid within the hydraulic reservoir as the liquid flows within the hydraulic reservoir.
Figure 4:
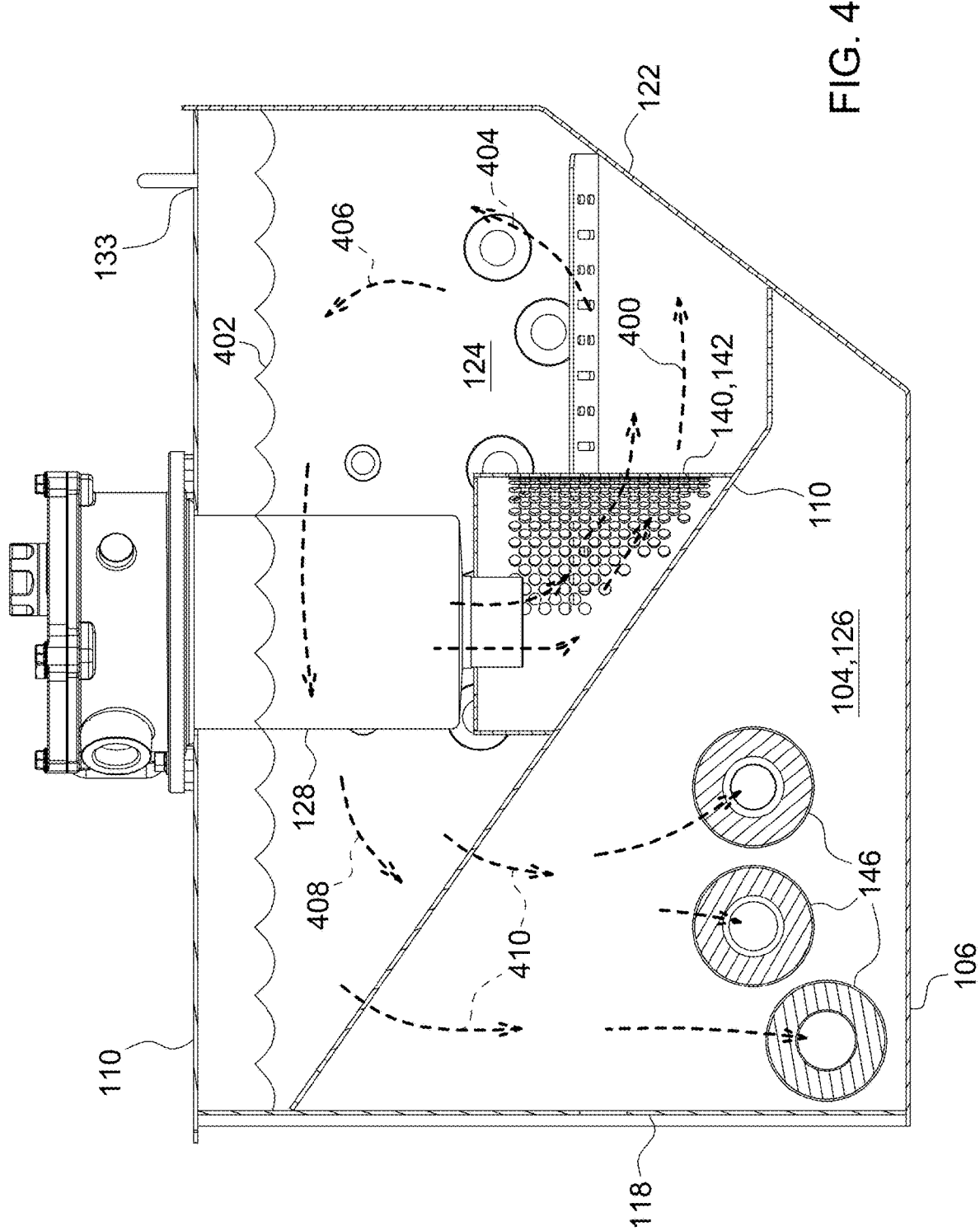
FIG. 4 is a side view of the example hydraulic reservoir of FIG. 1 showing a general flow path of liquid within the hydraulic reservoir.

In the illustrated example, the second plurality of apertures 148 are a plurality of slots 150. The plurality of slots 150 extend longitudinally along the inclined baffle 110 in a direction parallel to the length of the inclined baffle 110, which may correspond to a direction to of flow of the liquid within the cavity 104. In the illustrated example, the slots 150 are arranged in staggered relationship. Particularly, in the illustrated example, the plurality of slots 150 contain slots of different sizes with rows of slots having one size (e.g., a first length) being interdisposed between slots having a different size (e.g., a second length larger than the first length). In some implementations, some slots 150 may have a different length or width or both than other slots 150. As shown in FIG. 1, a row of slots 150 containing a first slot type 152 is located between rows of a second slot type 154. The first slot type 152 has a first length, and the second slot type 154 has a second length greater than the first length. It is believed that the slots 150 encourage separation of gas from the liquid as the liquid passes along and through the slots 150 and into the second portion 126 of the cavity 104. For example, bubbles of gas may be prevented from passing through the slots 150, promoting separation of the gas from the liquid. The bubbles of gas prevented from passing through the slots 150 rise towards the cover 108, where the gas escapes the liquid, for example joining a layer of gas provided above the liquid, as shown in FIGS. 3 and 4.

Although the second plurality of apertures 148 are illustrated as the plurality of slots 150 in the example of FIG. 1, in other implementations, the plurality of apertures 148 may have other shapes or be a mixture of other shapes. The plurality of apertures 148 may be, for example, a plurality of circular openings, a combination of circular openings and elongated openings (e.g., slots), or a plurality of openings having a common shape, a common size, or a combination of different sized openings that have a common shape.

In some implementations, a width of the slots 150 may be related to a size of the apertures 142 formed in the wall 138 of the diffusion chamber 132. For example, in some instances, a width of the slots 150 is within a range of 0.85 to 1.15 times a size of the diameter of the apertures 142. In some implementations, the second plurality of apertures 148 are formed along approximately 10% to 30% of the length of the inclined baffle 110.

As the liquid is directed into the reservoir 100 via the inlet conduit 130, the liquid impinges upon the inclined baffle 110 and is forced out of the diffusion chamber 132 and into the first portion 124 of the cavity 104 via the first plurality of apertures 142. It is noted that, generally, the liquid being introduced into the reservoir is liquid being returned to the reservoir after having been pumped to another location to perform work, to cool, or to perform some other type of activity. Impinging upon the inclined baffle 110 and flowing through the apertures 142 generates turbulence and produces a swirling behavior in the liquid, which encourages release of the entrained gas from the liquid.

FIG. 3 shows a cross-sectional view of the reservoir 100 shown in FIG. 1 and represents an aeration plot showing an amount of gas entrained in liquid contained in the reservoir 100. Particularly, FIG. 3 shows a fractional amount (i.e., volume fraction) of gas entrained in the liquid within the reservoir 100. Liquid 300 and gas 302 are contained in the cavity 104 of the reservoir 100. As show at 304, the liquid exiting the inlet conduit 130 has an increased amount of entrained gas compared to the other liquid present in the reservoir 100. As a result, the liquid at 304 has a decreased volume fraction of liquid (shown as volume fraction of oil in the illustrated example) present in the cavity 104, as indicated by the key 306. A reduction in the volume fraction of liquid indicates entrainment of gases, and an increase in the amount of gases entrainment corresponds to a reduced volume fraction of liquid. Thus, FIG. 3 shows how gases travel within the cavity 104 of the reservoir 100 as the liquid is introduced thereinto. As the liquid exits the diffusion chamber 132 via the first plurality of apertures 142, the liquid is directed towards the wall 122 on a first side of the inclined baffle 110 (i.e., into the first portion 124 of the cavity 104) and away from the outlets 146 located proximate to the side 118, opposite the side 122, and on an opposite side of the inclined baffle 110 (i.e., in the second portion 126 of the cavity 104).

By promoting turbulent flow in the liquid exiting the diffusion chamber 132, entrained gas is encouraged to separate from the liquid. Further, by directing the liquid away from the outlet 146, e.g., towards wall 122, a path traveled by the liquid prior to being drawn into the outlet 146 upon recirculation is increased. Entrained gas is illustrated by liquid having a reduced volume fraction of liquid, such as the liquid shown in 304. As shown, the gas has a trajectory towards the wall 122 and the cover 108, eventually joining the gas 302 contained near the cover 108 of the reservoir 100. In this manner, the gas is removed from the liquid.

Flow of the liquid within the cavity 104 is illustrated in FIG. 4. As shown, the introduced liquid travels in a generally circuitous route in the counterclockwise direction (as referenced in the context of FIG. 4). As the returning liquid strikes the inclined baffle 110 and exists through the first plurality of apertures 142, the liquid flow is agitated to promote release of the entrained gases and, thus, operates to de-aerate the liquid. After exiting the diffusion chamber 140, the liquid is directed away from the outlets 146 and towards wall 122, as indicated by arrow 400. The liquid contacts the inclined portion 129 of the side 122 and is, as a result, is directed upwards towards the cover 108 and the surface 402 of the liquid, as indicated by arrow 404. Additionally, suction generated as the liquid is drawn out of the outlets 146 also promotes swirling of the liquid. The liquid moves in a general counterclockwise direction, as indicated by arrow 406, and is directed towards the second plurality of apertures 148 formed in the inclined baffle 110, as indicated by arrow 408. As liquid is drawn out of the reservoir 100 via the outlets 146, the liquid is drawn towards the floor 106 (as indicated by arrow 410), through the second plurality of apertures 148, and into the second portion 126 of the cavity 104, as indicated by arrows 410.

As a result of the described flow path, the liquid being introduced into the reservoir is provided with an increased transient time within the cavity compared to current approaches, which promote flow of the returning fluid directly to the reservoir outlet. This increased transient time encourages improved separation and removal of entrained gases from the liquid, promoting de-aeration of the liquid. Consequently, improved performance of the liquid and a reduced risk of damage to pumps and other hydraulic devices due to cavitation are provided.

The reduction in entrained gas is shown in FIG. 3. On the opposing side of the inclined baffle 110 in the second portion 126 of the cavity 104, a reduced amount of entrained gas is shown at 308. Gases are prevented from passing into the second portion 126 of the cavity 104 by the second plurality of apertures 148 formed in the inclined baffle 110, as shown at 310. Also illustrated is the circuitous route traveled by the liquid between the inlet conduit 130 and the outlets 146.

Figure 5:
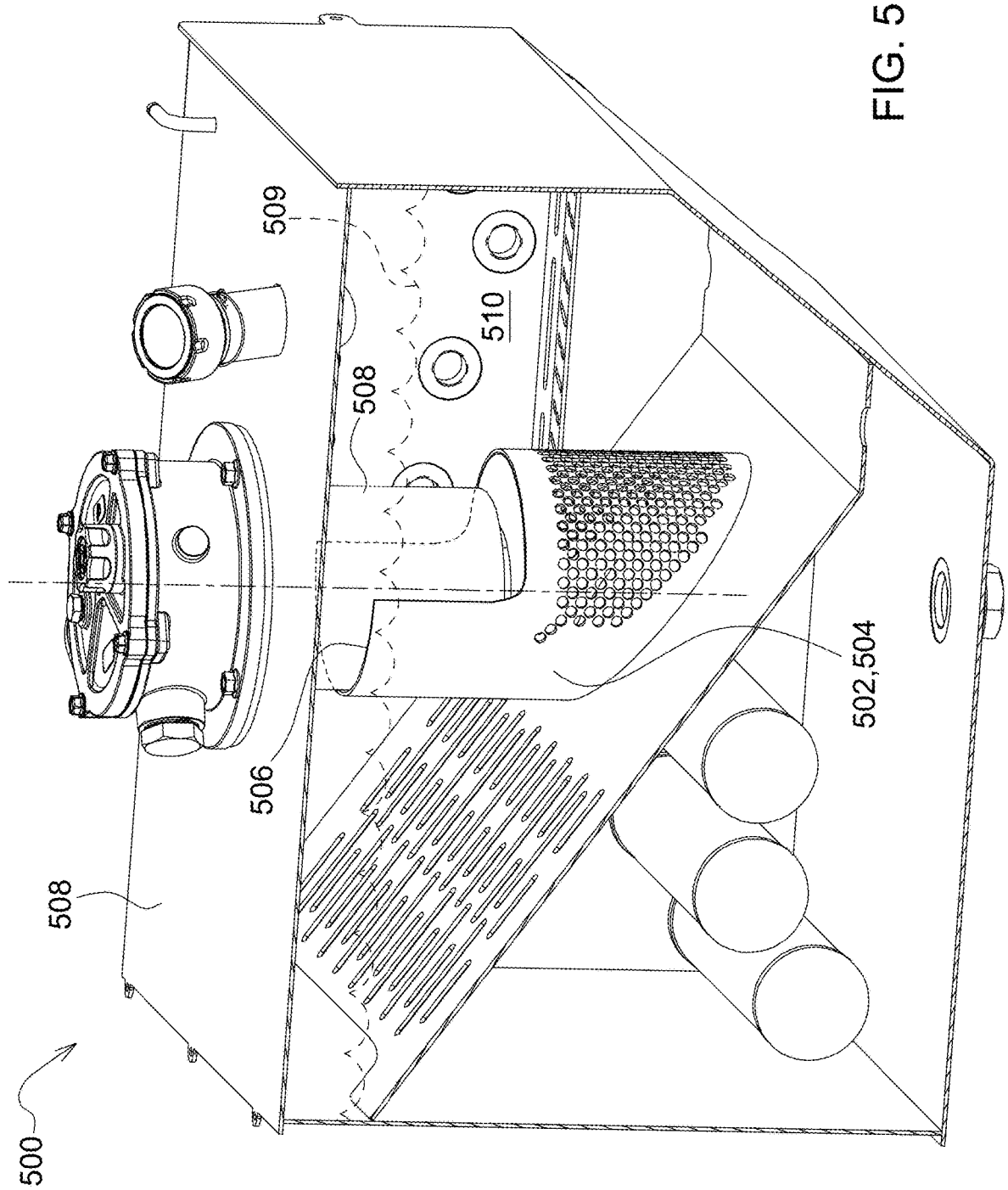
FIG. 5 is a perspective view of another example reservoir that includes a diffusion chamber having a lengthened wall, according to some implementations of the present disclosure.
Figure 6:
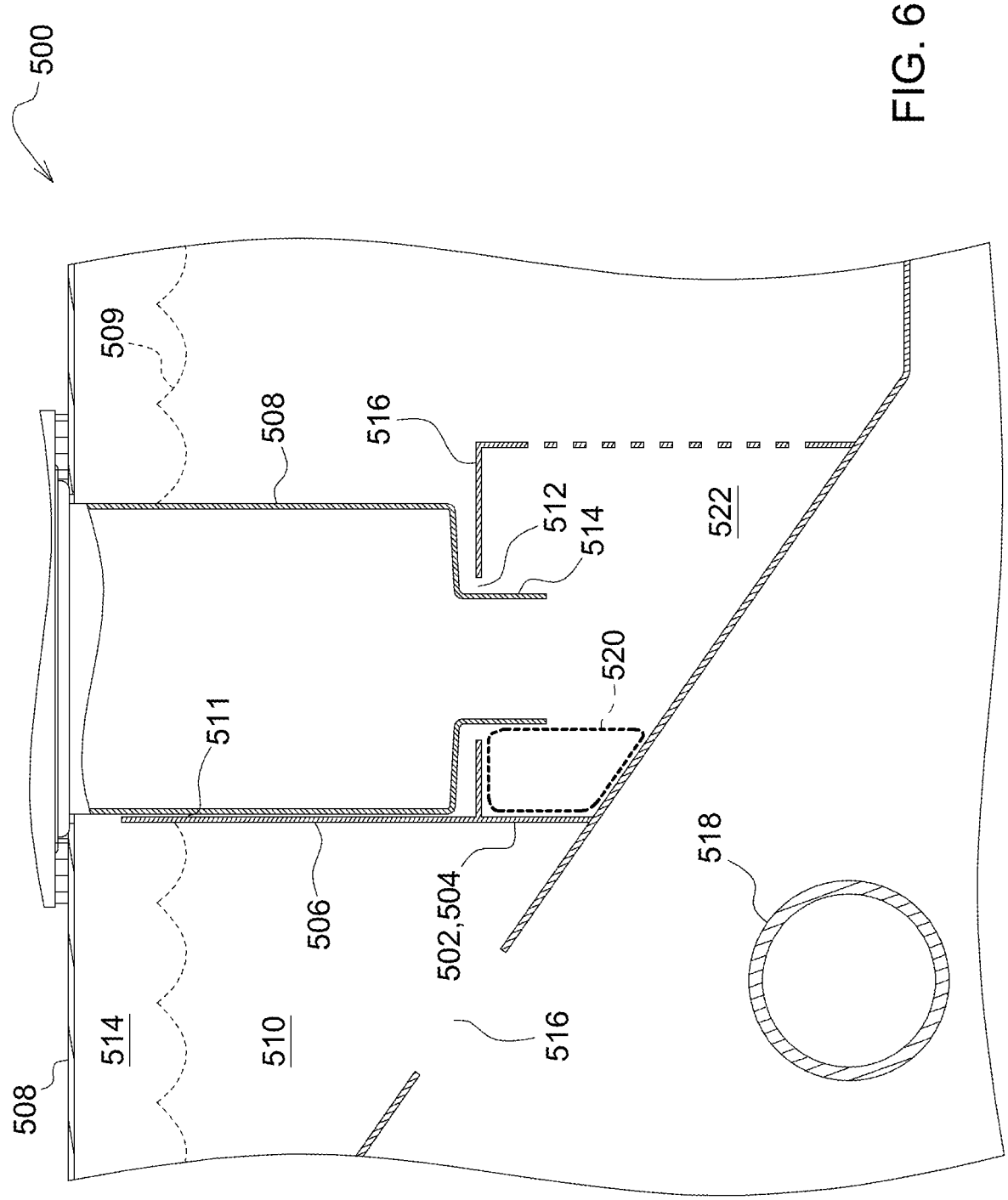
FIG. 6 is a detailed cross-sectional view of the reservoir of FIG. 5.

FIG. 5 shows another example reservoir 500. The reservoir 500 is similar to the reservoir 100 except that a wall 502 of a diffusion chamber 504, similar to the wall 138 of the diffusion chamber 132 of the reservoir 100, includes a portion 506 that extends towards a cover 508, similar to cover 108 of the reservoir 100. The portion 506 of wall 502 extends beyond a surface 509 of the hydraulic fluid 510 contained within the reservoir 500. The portion 506 of wall 502 surrounds at least a portion of an inlet conduit 508, which is similar to the inlet conduit 130 of the reservoir 100 and defines a passage 511 between the portion 506 of the wall 502 and the inlet conduit 508, as shown in FIG. 6. Although the portion 506 of the wall 502 is shown as surrounding a portion of the inlet conduit 508, in other implementations, the portion 506 of the wall 502 surround an entirety of the inlet conduit 508.

Referring to FIG. 6, in some implementations, the diffusion chamber 504 does not form a seal with the inlet conduit 508. As a result, a gap 512 is formed between an end portion 514 of the inlet conduit 508 and an end wall 516 of the diffusion chamber 504. Some of the gas entrained in the hydraulic fluid 510 received into the diffusion chamber 504 via the inlet conduit 508 can escape the through the gap 512 and be drawn through slots 516, which may be similar to slots 150, and directly into an outlet 518 (which may be similar to outlets 146). Thus, the gap 512 provides a route by which entrained gas is permitted to short-circuit the pathway described above, thereby reducing an amount of time in which the entrained gases can escape prior to the fluid being drawn out of the reservoir and increasing the likelihood that gases remain entrained in the hydraulic fluid. In some instances, entrained gas congregates within a portion 520 of an interior cavity 522 of the diffusion chamber 504. FIG. 3 illustrates this behavior at 312.

In order to avoid this short-circuit pathway, the passage 511 directs gases within the interior cavity 522 of the diffusion chamber 504 and, particularly, the portion 520 of the interior cavity 522 escaping through the gap 512 and into the cavity 514 located above the surface 509 of the hydraulic fluid 510. The gas is released into the cavity and prevented from being retained in the hydraulic fluid 510 as a result of the extension of the portion 506 of the wall 502 extending beyond the surface 509 of the hydraulic fluid 510.

A seal may be used to eliminate or reduce the risk of gas escaping from a diffusion chamber, as described above. FIG. 7 is a detail view of a portion of another reservoir 700 within the scope of the present disclosure. The reservoir 700 may be similar to the reservoir 100 and includes a diffusion chamber 702, similar to the diffusion chamber 132, and an inlet conduit 704, similar to inlet conduit 130. In order to eliminate or reduce gas escape between a gap, similar to gap 612 described earlier, formed between the diffusion chamber 702 and the inlet conduit 704, a seal is provided therebetween. For example, in some instances, a seal 706 is positioned between an opening 708 formed in the diffusion chamber 702 and an exterior surface 710 of the inlet conduit 704. In other instances, a seal 712 is positioned between an exterior surface 714 of the inlet conduit 704 and an exterior surface 716 of the diffusion chamber 702. Although both seals 706 and 712 are shown in FIG. 7, in other implementations, one of the seals 706 or 712 is included while the other of the seals 706 and 712 is omitted. In some implementations, one or both of the seals 706 and 712 may be an O-ring, or another sealing material. Other types of seals may be used, and the location of a seal between the diffusion chamber 702 and the inlet conduit 704 may different than those illustrated while still maintaining a barrier to the passage of gas from the diffusion chamber via a gap formed between the diffusion chamber and the inlet conduit.

Without in any way limiting the scope, interpretation, or application of the claims appearing below, a technical effect of one or more of the example implementations disclosed herein is improving de-aeration of a flow of liquid within a hydraulic reservoir. Another technical effect of one or more of the example implementations disclosed herein is improving performance of a working fluid and reducing risk of damage to hydraulic components by decreasing an amount of gas in the liquid.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A reservoir for a hydraulic system, the reservoir comprising:
   a housing comprising a floor and defining a first cavity;
   a baffle disposed in the first cavity and dividing the first cavity into a first portion and a second portion, the baffle and the floor defining an acute angle;
   an inlet conduit extending into the first portion of the first cavity, the inlet comprising:
   a first end; and
   a first longitudinal axis;
   a diffusion chamber formed within the first cavity, the diffusion chamber comprising:
   a cylindrical wall disposed within the first cavity and defining, at least partially, a second cavity, the first end of the inlet conduit extending into the second cavity of the diffusion chamber, the cylindrical wall defining a second longitudinal axis, an end of the cylindrical wall abutting the baffle, the second longitudinal axis and the baffle defining an oblique angle; and
   a first plurality of apertures formed in a portion of the wall of the diffusion chamber, the portion of the wall extending along less than an entire perimeter of the wall; and
   an outlet in fluid communication with the second portion of the first cavity,
   wherein the baffle comprises:
   a first portion extending in a first direction from the diffusion chamber;
   a second portion extending in a second direction from the diffusion chamber, the first plurality of apertures open towards the first portion of the baffle; and
   a second plurality of apertures formed in the second portion of the baffle, the second plurality of apertures providing fluid communication between the first portion of the first cavity and the second portion of the first cavity.

2. The reservoir of claim 1, wherein the baffle partially encloses the diffusion chamber.

3. The reservoir of claim 1, wherein the second plurality of apertures comprises a plurality of slots.

4. The reservoir of claim 3, wherein the plurality of slots are arranged in a plurality of rows.

5. The reservoir of claim 4, wherein the slots in adjacent rows of the plurality of rows are offset from each other.

6. The reservoir of claim 1, wherein the portion of the wall of the diffusion chamber in which the first plurality of apertures is formed is defined by a spread angle having a vertex lying on the first longitudinal axis.

7. The reservoir of claim 6, wherein the spread angle is within a range of 30° and 180°.

8. The reservoir of claim 1, wherein the acute angle defined between the baffle and the floor is within a range of 30° and 45°.

9. The reservoir of claim 1, wherein the second portion of the baffle is offset from the floor by a greater extent than the first portion of the baffle is offset from the floor.

10. The reservoir of claim 1, further comprising a seal formed between the diffusion chamber and the inlet conduit.

11. The reservoir of claim 1, wherein the cylindrical wall of the diffusion chamber extends beyond the second cavity.

12. A method of de-aerating a liquid by using the reservoir for a hydraulic system recited in claim 1, comprising:
   flowing a liquid, in a first direction, into a cavity of a reservoir, the reservoir comprising a baffle disposed in the cavity, the baffle comprising a first portion that is oriented at an angle relative to a floor of the reservoir;
   impinging the flow of liquid onto a portion of a first side of the baffle that extends along the first portion of the baffle;
   conducting the flow of liquid through a first plurality of apertures into a first portion of the cavity of the reservoir towards a first side of the reservoir; and
   generating turbulence in the flow of liquid as the flow of liquid exits the first plurality of apertures to release a gas entrained in the flow of liquid.

13. The method of claim 12, wherein the reservoir further comprises a diffusion chamber disposed in the cavity and wherein the first portion of the baffle forms a portion of the enclosure of the diffusion chamber.

14. The method of claim 13, wherein the first plurality of apertures is formed in a portion of a wall of the diffusion chamber.

15. The method of claim 14, wherein the portion of the wall in which the first plurality of apertures is formed is defined by a spread angle having a vertex along a longitudinal axis of the diffusion chamber, the spread angle being within a range of 30° and 180°.

16. The method of claim 13, wherein flowing a liquid into a reservoir comprises flowing the fluid into the diffusion chamber.

17. The method of claim 12, further comprising:
   flowing the fluid in a second direction different than the first direction; and
   passing the fluid through a second plurality of apertures formed in a second portion of the baffle and into a second portion of the cavity disposed on a second side of the baffle opposite the first side.

18. The method of claim 17, wherein the second portion of the baffle is angled relative to the floor and wherein the second portion is offset from the floor by a greater extent than the first angled portion of the baffle.

19. The method of claim 17, wherein passing fluid through the second plurality of apertures comprises directing the fluid towards an outlet of the reservoir disposed on the second side of the baffle opposite the first side of the baffle.

20. The method of claim 17, wherein the second plurality of apertures comprises a plurality of slots.

* * * * *